United States Patent
Turnbull et al.

(10) Patent No.: US 12,260,682 B2
(45) Date of Patent: Mar. 25, 2025

(54) TOLL MODULE

(71) Applicant: GENTEX CORPORATION, Zeeland, MI (US)

(72) Inventors: Robert R. Turnbull, Holland, MI (US); Douglas C. Papay, Zeeland, MI (US)

(73) Assignee: GENTEX CORPORATION, Zeeland, MI (US)

( * ) Notice: Subject to any disclaimer, the term of this patent is extended or adjusted under 35 U.S.C. 154(b) by 57 days.

(21) Appl. No.: 18/307,158

(22) Filed: Apr. 26, 2023

(65) Prior Publication Data

US 2023/0343143 A1 Oct. 26, 2023

Related U.S. Application Data

(60) Provisional application No. 63/334,697, filed on Apr. 26, 2022.

(51) Int. Cl.
*G07B 15/06* (2011.01)
*G07B 15/00* (2011.01)
*H04W 4/40* (2018.01)

(52) U.S. Cl.
CPC .......... *G07B 15/063* (2013.01); *G07B 15/00* (2013.01); *H04W 4/40* (2018.02)

(58) Field of Classification Search
CPC ....... G07B 15/00; G07B 15/063; H04W 4/40; G08B 15/00
See application file for complete search history.

(56) References Cited

U.S. PATENT DOCUMENTS

| | | | | | |
|---|---|---|---|---|---|
| 5,933,096 | A | * | 8/1999 | Tsuda | G07B 15/063 340/928 |
| 7,548,153 | B2 | * | 6/2009 | Gravelle | G06K 7/016 370/467 |
| 7,813,699 | B2 | * | 10/2010 | Ho | G07B 15/06 455/99 |
| 9,599,703 | B2 | * | 3/2017 | Vinski | G06K 7/10207 |
| 10,094,855 | B1 | * | 10/2018 | Fuhr | G01R 13/0281 |
| 11,030,428 | B2 | * | 6/2021 | Boehm | G06K 7/10366 |
| 11,290,084 | B2 | * | 3/2022 | Nielsen | H03H 9/542 |

* cited by examiner

*Primary Examiner* — John A Tweel, Jr.
(74) *Attorney, Agent, or Firm* — Price Heneveld LLP; Brian James Brewer

(57) ABSTRACT

The present disclosure is directed to a vehicle toll module, which may comprise a first antenna, a radio frequency power detector, an attenuator, and/or a controller. The first antenna may receive a first signal from a toll collection system remotely located relative the vehicle and generate a first output based thereon. The radio frequency power detector may be configured to adjust the first output to generate a second output. The attenuator may be configured to receive the second output and generate a third output based thereon. The controller may be connected to the attenuator and configured to: receive the third output, extract data from the second output, and generate a third output based on a unique identifier associated with the toll module, in response to the extracted data. Additionally, the third output may be received by an antenna which may either transmit a second signal or backscatters the first signal.

15 Claims, 5 Drawing Sheets

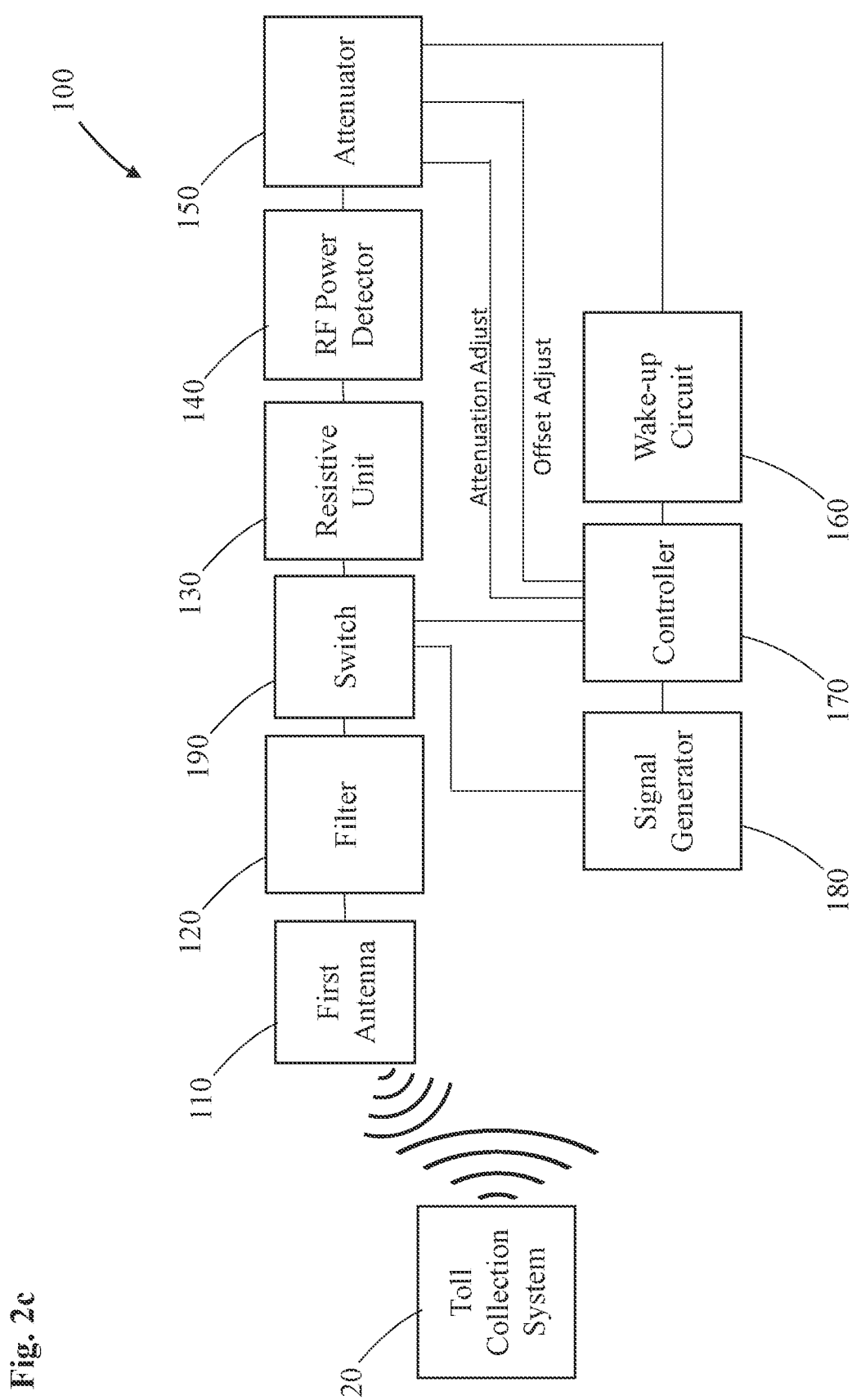

TOLL MODULE

CROSS-REFERENCE TO RELATED APPLICATIONS

This application claims priority under 35 U.S.C. § 119(e) to U.S. Provisional Application No. 63/334,697 filed on Apr. 26, 2022, entitled "Improved Toll Module," the disclosure of which is hereby incorporated by reference in its entirety.

FIELD OF INVENTION

The present disclosure relates, in general, to toll modules and, more particularly, to vehicle-based toll modules for communication with a toll collection system.

SUMMARY

According to one aspect of the present disclosure, a vehicle toll module is disclosed. The toll module may comprise a first antenna, a radio frequency power detector, an attenuator, and/or a controller. The first antenna may be configured to receive a first signal from a toll collection system remotely located relative the vehicle and generate a first output based, at least in part, on the received first signal. The radio frequency power detector may be communicatively connected to the first antenna and configured to adjust the first output and generate a second output based, at least in part, on the adjusted first output. The attenuator may be communicatively connected to the first antenna and configured to: receive the second output and generate a third output based, at least in part, on the received first output. The controller may be communicatively connected to the attenuator and configured to: receive the third output, extract data from the second output, and generate a third output based, at least in part, on a unique identifier associated with the vehicle toll module, in response to the extracted data. Additionally, third output may be received by a second antenna, which is configured to transmit a second signal based, at least in part, on the received third output. The second signal may include a unique identifier and be operably received by the toll collection system. Alternatively, the third output may be received by the first antenna, which is further configured to backscatter the first signal based, at least in part, on the received third output. The backscattering of the first signal operable to provide the unique identifier. In some embodiments, the second antenna may be the first antenna. In some embodiments, the toll module does not have a zero-bias Schottky diode.

In some embodiments, the toll module may further comprise a resistive unit communicatively disposed between the radio frequency power detector and the first antenna. The resistive unit may be configured to adjust an amplitude of the first output to better match a sensitivity of the radio frequency power detector.

In some embodiments, the toll module may further comprise a comparator. The comparator may be communicatively connected to both the attenuator and the data separator. Further, the comparator may be configured to: receive the second output from the attenuator and based, at least in part, on receipt of the second output, send a wake-up signal to the controller. Further, the controller may be configured to enter and remain in a sleep state when not needed for data extraction.

In some embodiments, the third output may be received by the second antenna. In other embodiments, the third output may be received by the first antenna. In some embodiments, the third output corresponds to at least one of: a unique identifier used to electronically collect a toll from an account and an access authorization.

In some embodiments, the toll module may further comprise a filter. The filter may be configured to filter the received first signal to an expected frequency range.

In some embodiments, the toll module may further comprise a resistive unit. The resistive unit may be configured to adjust the amplitude of the first output. In some such embodiments, the amplitude of the first output may be adjusted to substantially match a sensitivity of the radio frequency power detector. Additionally or alternatively, the resistive unit may be configured to normalize for unit-to-unit variation between radio frequency power detectors across a plurality of toll modules.

In some embodiments, the toll module may further comprise an attenuator. The attenuator may be configured to receive an input from the controller to adjust an attenuation applied by the attenuator in generating the third output. In some such embodiments, the adjustment to the attenuation may compensate for unit-to-unit variations in the radio frequency power detector across a plurality of toll modules. Additionally or alternatively, the attenuator may have a substantially constant output impedance.

These and other aspects, objects, and features of the present disclosure will be understood and appreciated by those skilled in the art upon studying the following specification, claims, and appended drawings. It will also be understood that features of each embodiment disclosed herein may be used in conjunction with, or as a replacement for, features in other embodiments.

BRIEF DESCRIPTION OF FIGURES

In the drawings:

FIG. 2c: A schematic representation of an embodiment of a toll module; and

DETAILED DESCRIPTION

For the purposes of description herein, the specific devices and processes illustrated in the attached drawings and described in this disclosure are simply exemplary embodiments of the inventive concepts defined in the appended claims. Hence, specific characteristics relating the embodiments disclosed herein are not limiting, unless the claims expressly state otherwise.

Prior toll modules have poor receiving sensitivity. The receivers are based on a zero-bias Schottky diode, which has low sensitivity, suffers from temperature instability, and has poor electro-static discharge tolerance. Additionally, the detector diode has a high output impedance, which, for certain applications, requires buffering in order to prevent loading of the output.

Figure 1:
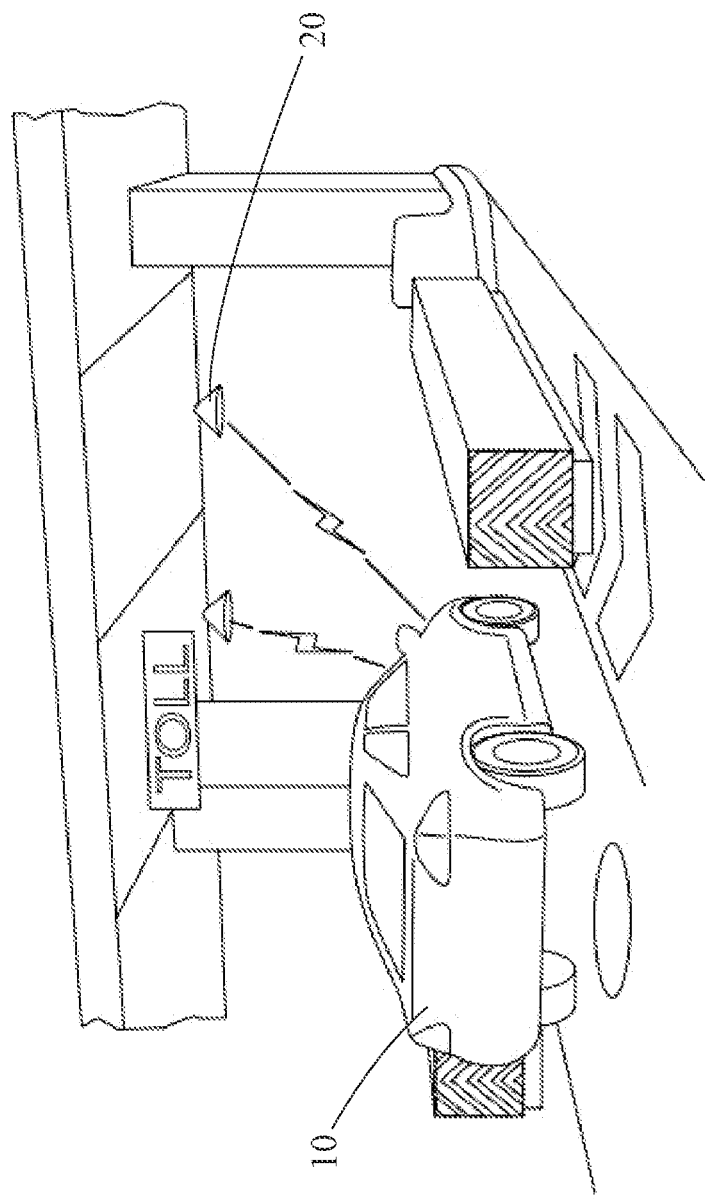
FIG. 1: A representation of a vehicle equipped toll module in communication with a toll collection system.
Figure 2A:
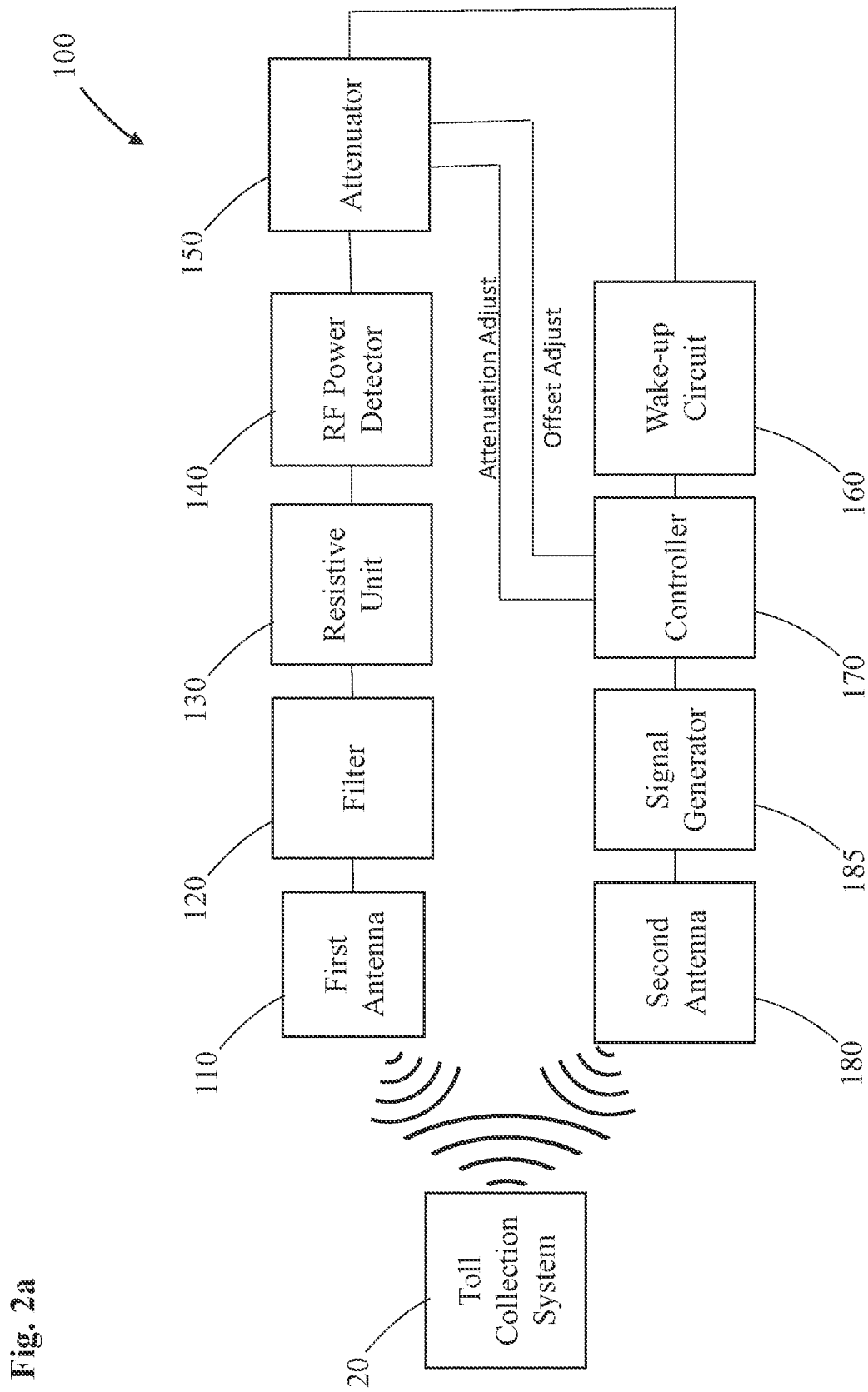
FIG. 2a: A schematic representation of an embodiment of a toll module.
Figure 2B:
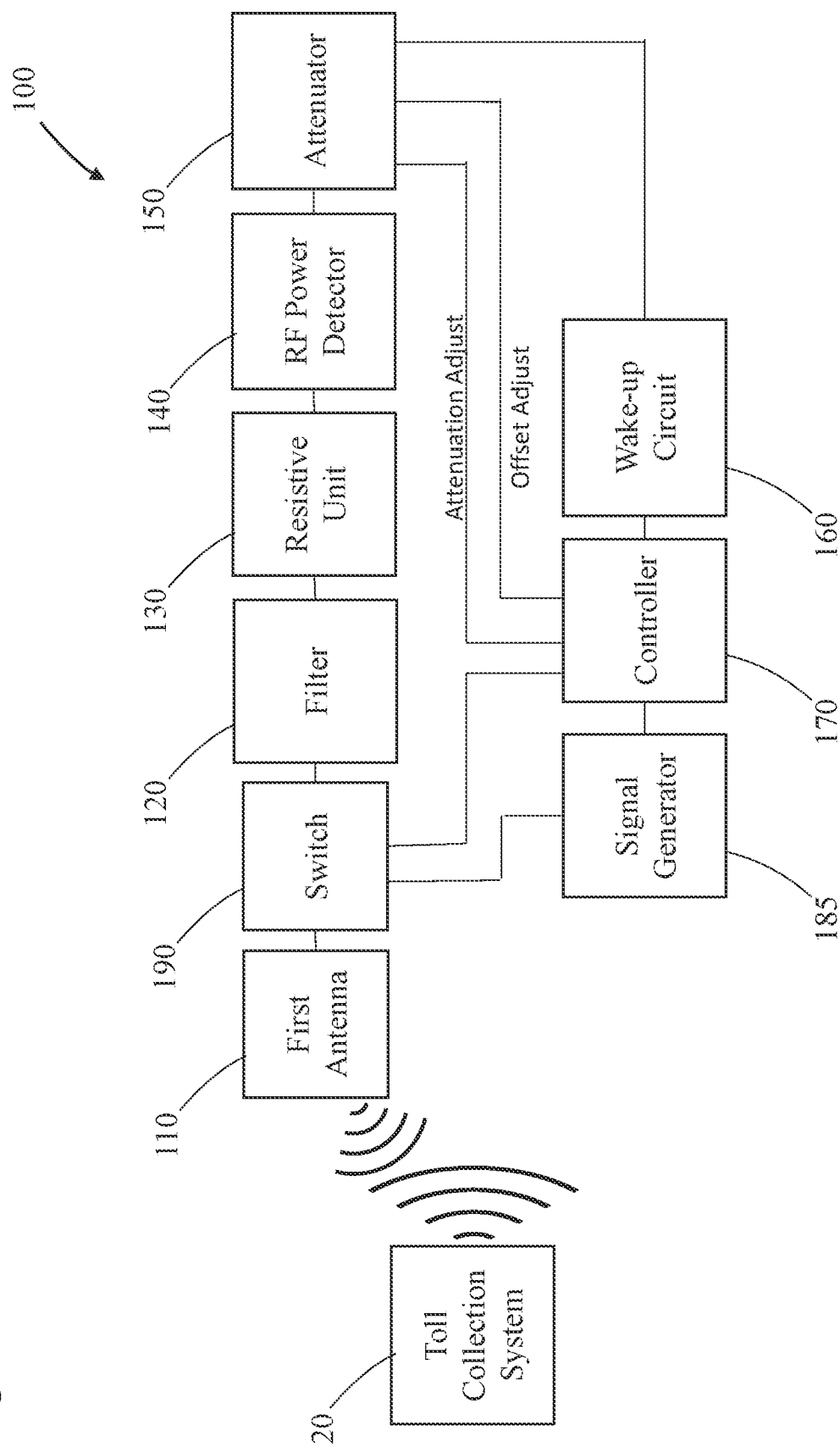
FIG. 2b: A schematic representation of an embodiment of a toll module.
Figure 3:
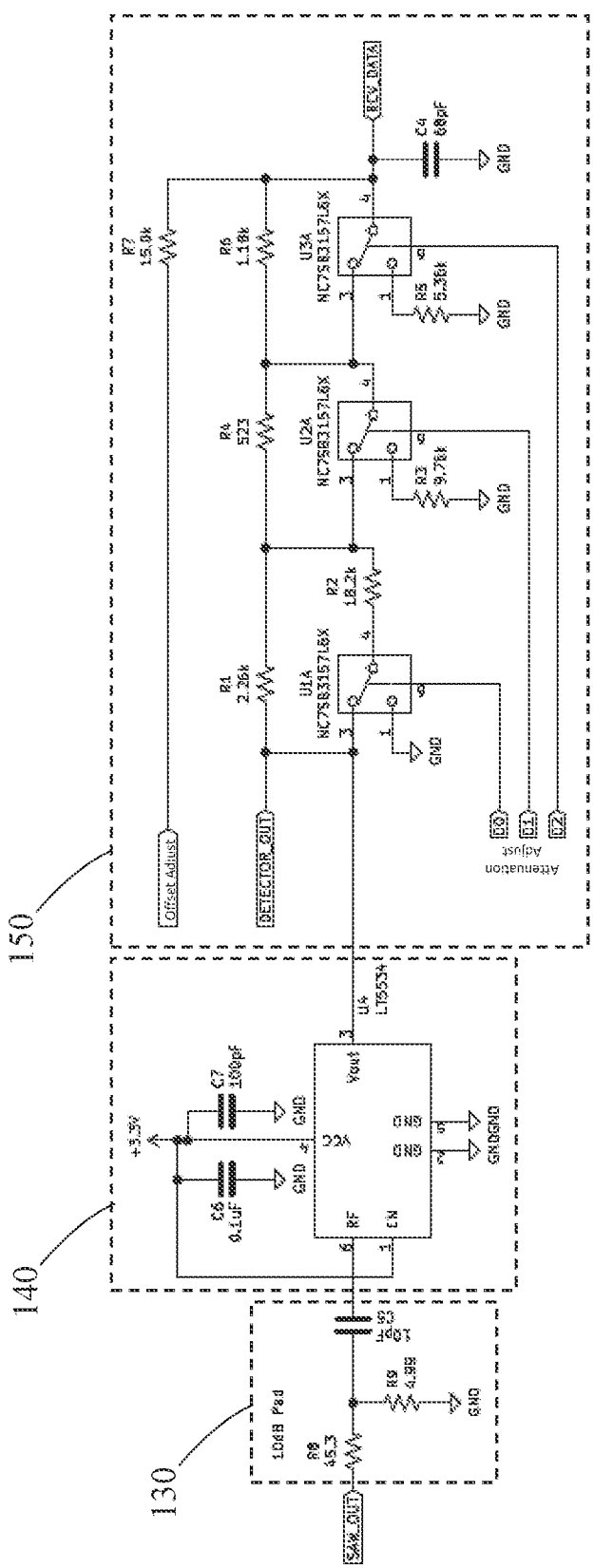
FIG. 3: An electrical diagram schematic representation of a portion of an embodiment of a toll module.

FIGS. 1-3 illustrate aspects of an improved toll module 100. The presently disclosed toll module 100 addresses many shortcomings of the prior toll modules. Toll module 100 may comprise a first antenna 110, a filter 120, a resistive unit 130, a radio frequency power detector 140, an attenuator 150, a wake-up circuit 160, controller 170, and/or a second antenna 180. Accordingly, in some embodiments, toll module 100 does not have a zero-bias Schottky diode. Additionally, toll module 100 may be disposed on or in a vehicle 10. In some embodiments, toll module 100 may be associated with a windshield, bumper, or other location of the vehicle 10. Additionally or alternatively, toll module 100 may be incorporated into a vehicle rearview assembly. Further, toll module 100 may be configured to and/or operable to wirelessly communicate with a remotely located electronic toll collection system 20.

Toll collection systems 20 may be configured to and/or operable to collect tolls for vehicles accessing certain roads, bridges, tunnels, and/or areas. Exemplary toll collection systems 20 may include E-Zpass, SunPass, or EPass. Further, toll collection systems 20 may be configured to and/or operable to remotely broadcast a wireless signal to vehicle 10 toll modules 100. Additionally, toll collection system 20 may be configured to and/or operable to receive a unique identifier based, at least in part, on feedback from one or more toll module 100. The feedback may be in the form of an actively transmitted signal from toll module 100 or a backscattering of the wireless signal from toll collection system 20. The unique identifier may be used to electronically collect a toll from an account associated with the respective toll module 100 and/or determine an access authorization of the toll module 100. In some embodiments, the toll collection systems 20 may include a movable barrier, such as a gate. Accordingly, the movable barrier may be moved based, at least in part, on the collection of the toll and/or a determined access authorization.

First antenna 110 may be configured to and/or operable to wirelessly receive and/or transmit signals. For example, first antenna 110 may be a flat induction coil, an induction coil on a ferrous core, a single dipole, a double dipole, a monopole, a yagi, a patch, or a slot type antenna. Further, first antenna 110 may be configured to and/or operable to receive a wireless signal transmitted from a toll collection system 20. Accordingly, toll module 100 may be communicatively connected to toll collection systems 20 via first antenna 110. In some embodiments, the received signal may be within a first frequency range. In some embodiments, the first frequency range may include a radio frequency identification (RFID) frequency band. For example, the frequency range may substantially correspond to and/or include an ISM 915 MHz band (902-928 MHz). The received signal may be output by first antenna 110 as a first output.

Filter 120 may be communicatively connected to first antenna 110. Accordingly, filter 120 may be configured to and/or operable to receive the first output from first antenna 110 and filter the first output. In some embodiments, the filter may be configured to and/or operable to substantially limit the signal of the first output to the first frequency range. Therefore, the signal may be substantially limited to a fundamental frequency of the signal.

Resistive unit 130 may be communicatively connected to first antenna 110 and/or filter 120. Accordingly, resistive unit 130 may be configured to and/or operable to receive the first output and/or a filtered first output. Further, resistive unit 130 may be configured to and/or operable to adjust an amplitude of the first output and/or the filtered first output. The amplitude may be adjusted such that the resulting signal better controls a sensitivity of a component of toll module 100. For example, in some embodiments, the amplitude may be adjusted to substantially match a sensitivity of radio frequency power detector 140.

Radio frequency power detector 140 may be communicatively connected to first antenna 110, filter 120, and/or resistive unit 130. Accordingly, radio frequency power detector 140 may be configured to and/or operable to receive the first output, the filtered first output, and/or the fine adjusted first output. Further, radio frequency power detector 140 may be configured to and/or operable to generate a second output, based, at least in part, on the first output, the filtered first output, and/or the adjusted first output. The second output may be a low frequency output based on the power of the input. Additionally, the second output may amount to a fine adjustment of the signal.

Attenuator 150 may be communicatively connected to first antenna 110, filter 120, resistive unit 130, and/or radio frequency power detector 140. Accordingly, attenuator 150 may be configured to and/or operable to receive the first output, the filtered first output, the adjusted first output, and/or the second output. Further, attenuator 150 may be a step attenuator, such as a log step attenuator, or a switch attenuator. Additionally, attenuator 150 may be configured to and/or operable to generate a third output, based, at least in part, on the first output, the filtered first output, the adjusted first output, and/or the second output. The third output may amount to a fine adjustment of the signal. Accordingly, resistive unit 130 may be configured to and/or operable to normalize for unit-to-unit variation between radio frequency power detectors 140 utilized during assembly of toll modules 100. Additionally, as shown in FIG. 3, attenuator 150 may have inputs D0, D1, and D2, which control analog switches of attenuator 150. These inputs may be received from controller 170 and be configured to and/or operable to provide for an attenuation adjustment. Additionally and/or alternatively, attenuator 150 may receive an offset adjustment input from controller 170. In some embodiments, attenuator 150 may have a substantially constant output impedance.

Wake-up circuit 160 may be communicatively connected to attenuator 150. Accordingly, wake-up circuit 160 may be configured to and/or operable to receive the third output. Further, wake-up circuit 160 may be configured to and/or operable to detect the signal of the third output and generate one or more wake-up signal 160, based, at least in part, on the detection. In some embodiments, wake-up circuit 160 may be a comparator.

Controller 170 may be communicatively connected to attenuator 150 and/or wake-up circuit 160. Accordingly, controller 170 may be configured to and/or operable to receive the third output and/or the wake-up signal. In some embodiments, controller 170 may comprise a memory and/or a processor. The memory may be configured to and/or operable to store one or more algorithms configured to and/or operable to carry out the functions of controller 170 and the processor may be configured to and/or operable to execute the one or more algorithms. Further, controller 170 may be configured to and/or operable to extract data from the signal of the third output. The extracted data may be configured to and/or operable to identify toll collection system 20 and/or implore as to the vehicle 10 toll module's 100 identity. Based, at least in part, on the extracted data, controller 170 may be further configured and/or operable to generate a fourth output. The fourth output may be based, at least in part, on the unique identifier associated with toll module 100. Additionally, in some embodiments, controller 170 may be configured and/or operable to enter and/or remain in a low power or an off state when not needed for data extraction. Based, at least in part, on receipt of the wake-up signal, controller 170 may be configured to and/or operable to power up (i.e. wake-up) for data extraction from the signal.

Additionally, controller 170 may provide an output from a Digital to Analog Converter ("DAC"), filtered PWM, un-filtered PWM, switched resistive network, or an equivalent controlled variable source. The output may be provided as the "offset adjust," shown in FIGS. 2a-3, to add an adjustable offset voltage to the data signal to compensate for unit-to-unit variations in the output offset of radio frequency power detector 140. Further, in some embodiments, controller 170 may provide one or more gain calibration adjustment control signals, shown as "attenuation adjust" in FIGS. 2a-3, to compensate for unit-to-unit variations in the gain of radio frequency power detector 140. The substantially constant output impedance of attenuator 150 may have the advantage of minimizing interaction between the gain and offset adjustments. An additional advantage of attenuator 150 is that the bandwidth of low pass filter C4 of attenuator 150 and the output resistance of the resistor network remains substantially constant for any combination of gain and offset settings. The gain and offset values for each unit may be determined during manufacturing to minimize unit-to-unit sensitivity and wake-up threshold variation. These calibration values may be stored in the memory of controller 170.

Second antenna 180 may be communicatively connected to controller 170. Second antenna 180 may be configured to wirelessly transmit and/or receive signals. For example, second antenna 180 may be a flat induction coil, an induction coil on a ferrous core, a single dipole, a double dipole, a monopole, a yagi, a patch, or a slot type antenna. Thus, toll module 100 may be communicatively connected to toll collection systems 20 via second antenna 180.

In some embodiments, such as shown in FIG. 2a. second antenna 180 may be an additional antenna, independent of first antenna 110. In such an embodiment, second antenna 180 may be an active antenna. Accordingly, second antenna 180 may be configured to and/or operable to transmit a wireless signal to one or more toll collection systems 20. As such, toll module 100 may further comprise a signal generator 185 communicatively connected and disposed between controller 170 and second antenna 180. Signal generator 185 may be configured to and/or operable to generate the signal for transmission by second antenna 180 based, at least in part, on the fourth signal. Signal generator 185, for example, may be a modulator. As such, signal generator 185 may comprise an oscillator connected to an op-amp controlled by the fourth signal from controller 170. The output from signal generator 185 may be transmitted by second antenna 180. In some embodiments, the transmitted signal may include a second frequency range. In some such embodiments, the second frequency range may be the same as the first frequency range. Further, the wirelessly transmitted signals may comprise or be based, at least in part, on the unique identifier associated with toll module 100. As such, the wirelessly transmitted signal may be based, at least in part, on the fourth output.

In other embodiments, such as shown in FIGS. 2b-c, the first and second antennas 110, 180 may be a single antenna. In some such embodiments, first antenna 110 may be an active antenna. Additionally or alternatively, first antenna 110 may be configured to and/or operable to backscatter the wireless signal transmitted from the toll collection system 20, to convey a unique identifier. In embodiments where first antenna 110 is an active antenna, toll module 100 may further comprise a signal generator 185 communicatively connected and disposed between controller 170 and first antenna 110. Signal generator 185 may be configured to and/or operable to generate the signal for transmission by first antenna 110 based, at least in part, on the fourth signal. Signal generator 185, for example, may be a modulator. As such, signal generator 185 may comprise an oscillator connected to an amplifier controlled by the fourth signal from controller 170. The output from signal generator 185 may be transmitted by first antenna 110. In some embodiments, the transmitted signal may include a second frequency range. In some such embodiments, the second frequency range may be the same as the first frequency range. Further, the wirelessly transmitted signals may comprise or be based, at least in part, on the unique identifier associated with toll module 100. As such, the wirelessly transmitted signal may be based, at least in part, on the fourth output. In some embodiments where first antenna 110 is configured to and/or operable to backscatter the wireless signal transmitted from the toll collection system 20, toll module 100 may forgo signal generator 185.

Additionally, in embodiments where the first and second antennas 110, 180 may be a single antenna, toll module 100 may further comprise a switch 190. Switch 190 may be communicatively connected to and disposed between a) controller 170 and/or signal generator 185 and b) first antenna 110.

In some embodiments, such as shown in FIG. 2b, switch 190 may be further communicatively disposed between disposed first antenna 110 and filter 120. As such, switch 190 may enable first antenna 110 to selectively communicate with either a) signal generator 185 and/or controller 170 or b) filter 120, depending on the state of switch 190.

In other embodiments, such as shown in FIG. 2c, switch 190 may be further communicatively disposed between disposed first antenna 110 and filter 120. As such, switch 190 may enable first antenna 110 and/or filter 120 to selectively communicate with either a) signal generator 185 and/or controller 170 or b) resistive unit 130, depending on the state of switch 190. In such an embodiment, by sending the signal from signal generator 185 through filter 120 before transmission by first antenna 110, toll module 100 may have the advantage suppressing transmitter harmonics.

In embodiments where first antenna 110 is configured to and/or operable to backscatter the wireless signal transmitted from the toll collection system 20, controller 170 may cause switch 190 to select between two different impedance states. The different states may correspond to a matched state and a mismatched state. The matched state may correspond to a receiving state of first antenna 110, where the received signal is passed to filter 120 and/or resistive unit 130. In such a state, the signal from toll collection system 20 may be substantially absorbed by first antenna 110. The miss-matched state may correspond to first antenna 110 being in a state for backscattering where first antenna 110 substantially reflects at least part of the signal from toll collection system 20.

Embodiments of the presently disclosed toll module 100 may have various advantages over prior toll modules. Namely, using resistive unit 130, radio frequency power detector 140, and/or attenuator 150 may eliminate the need for a number of components of prior toll modules. For instance, zero bias Schottky diodes, temperature compensators, signals buffers, and gain controls may be eliminated. The elimination of these elements results in a substantially reduced number of electrical components, which would drastically increase cost and size. The smaller size of the presently disclosed toll module 100 enables fitment into complex rearview assemblies where space is a premium, such as those with advanced features such as cameras and digital displays covering a majority of the viewing surface.

In this document, relational terms, such as "first," "second," and the like, are used solely to distinguish one entity or action from another entity or action, without necessarily requiring or implying any actual such relationship or order between such entities or actions.

As used herein, "communicatively connected" may mean connected directly or indirectly though one or more electrical components.

As used herein, the term "and/or," when used in a list of two or more items, means that any one of the listed items can be employed by itself, or any combination of the two or more of the listed items can be employed. For example, if a composition is described as containing components A, B, and/or C, the composition can contain A alone; B alone; C alone; A and B in combination; A and C in combination; B and C in combination; or A, B, and C in combination.

The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

It is to be understood that although several embodiments are described in the present disclosure, numerous variations, alterations, transformations, and modifications may be understood by one skilled in the art, and the present disclosure is intended to encompass these variations, alterations, transformations, and modifications as within the scope of the appended claims, unless their language expressly states otherwise.

What is claimed is:

1. A vehicle toll module, comprising:
    a first antenna configured to receive a first signal from a toll collection system remotely located relative a vehicle and generate a first output based, at least in part, on the received first signal;
    a radio frequency power detector communicatively connected to the first antenna and configured to adjust the first output and generate a second output based, at least in part, on the adjusted first output;
    an attenuator communicatively connected to the first antenna and configured to: receive the second output, and generate a third output based, at least in part, on the received first output; and
    a controller communicatively connected to the attenuator and configured to:
        receive the third output,
        extract data from the second output, and
        generate a fourth output based, at least in part, on a unique identifier associated with the vehicle toll module, in response to the extracted data;
    wherein the third output is at least one of:
        received by a second antenna, which is configured to transmit a second signal based, at least in part, on the received third output, the second signal including a unique identifier and operable to be received by the toll collection system, and
        received by the first antenna, which is further configured to backscatter the first signal based, at least in part, on the received third output, the backscattering of the first signal operable to provide the unique identifier.

2. The vehicle toll module of claim 1, wherein the second antenna is the first antenna.

3. The vehicle toll module of claim 1, further comprising: a resistive unit communicatively disposed between the radio frequency power detector and the first antenna, the resistive unit configured to adjust an amplitude of the first output to better match a sensitivity of the radio frequency power detector.

4. The vehicle toll module of claim 1, further comprising:
    a comparator communicatively connected to the attenuator, the comparator configured to:
        receive the second output from the attenuator, and
        based, at least in part, on receipt of the second output, send a wake-up signal to the controller;
    wherein the controller is configured to enter and remain in a sleep state when not needed for data extraction.

5. The vehicle toll module of claim 1, wherein the vehicle toll module does not have a zero-bias Schottky diode.

6. The vehicle toll module of claim 1, wherein the third output is received by the second antenna.

7. The vehicle toll module of claim 1, wherein the third output is received by the first antenna.

8. The vehicle toll module of claim 1, wherein the third output corresponds to at least one of:
    a unique identifier used to electronically collect a toll from an account, and
    an access authorization.

9. The vehicle toll module of claim 1, further comprising a filter configured to filter the received first signal to an expected frequency range.

10. The vehicle toll module of claim 3, further comprising a resistive unit configured to adjust the amplitude of the first output.

11. The vehicle toll module of claim 10, wherein the amplitude of the first output is adjusted to substantially match a sensitivity of the radio frequency power detector.

12. The vehicle toll module of claim 10, wherein the resistive unit is configured to normalize for unit-to-unit variation between radio frequency power detectors across a plurality of toll modules.

13. The vehicle toll module of claim 1, wherein the attenuator is configured to receive an input from the controller to adjust an attenuation applied by the attenuator in generating the third output.

14. The vehicle toll module of claim 13, wherein the adjustment to the attenuation compensates for unit-to-unit variations in the radio frequency power detector across a plurality of toll modules.

15. The vehicle toll module of claim 1, wherein the attenuator has a substantially constant output impedance.

* * * * *